2,987,392
METHOD OF RAPIDLY PRODUCING METALLIC POWDERS OF HIGH PURITY
Lester D. Supiro, 32 S. Munn Ave., East Orange, N.J.
No Drawing. Filed Feb. 2, 1960, Ser. No. 6,102
12 Claims. (Cl. 75—90)

This invention relates generally to the reduction of compounds of metals to relatively pure metallic powders, and more particularly, to a method for rapidly reducing metallic oxides or similar metal compounds to metallic powders, in a quiet, non-violent manner without the eruption of the metallic oxides or other compounds and without the formation of clinkers.

It is among the objects of my invention to speed the reduction of metal compounds such as metallic oxides, particularly the higher oxides or ammonium compounds of metal, which by present procedures involve protracted processing at relatively high temperatures and large volumes of relatively costly reducing gases.

Another object of my invention is the reduction of the higher oxides or ammonium compounds of molybdenum, tungsten and other metals which are subject to reduction by hydrogen.

A still further object of my invention is to provide a method for the reduction of higher metallic oxides in which the end product is a metal powder of high purity, and the formation of clinkers and the incapsulation of oxides is avoided.

Yet a further object of my invention is to avoid so slow a reduction of higher metallic oxides, that when an elevated temperature is reached, a violent reaction takes place with eruption or spattering of the higher oxides and formation of clinkers.

A still further object of my invention is to eliminate the necessity for diluting the reducing gas with an inert gas in order to slow down the exothermic part of the reduction, in order to maintain the reaction temperature below the critical temperature at which the eruption of the higher oxides takes place, or at which clinkers are formed; one present method makes it necessary to resort to the use of steam or inert gases in order to slow the rise in temperature.

Yet a further object of my invention is to cause the reduction of higher oxides to lower oxides to proceed with such rapidity that reduction is virtually complete by the time the critical temperature is reached, i.e., the temperature at which the reaction becomes violent and the reaction materials erupt.

These objects and advantages as well as other objects and advantages may be achieved by the methods hereinafter referred to.

Rapid production of molybdenum is difficult to accomplish. Starting with a higher oxide (molybdenum trioxide) of molybdenum, reduction is carried out in a tube furnace in a reducing (hydrogen) atmosphere, with external heat to carry on the reaction. Since the reaction is exothermic, temperature rises rapidly unless the hydrogen is diluted with steam or an inert gas to slow the reduction. The reduction must not be allowed to reach a high temperature (approximately 700° C.) before the trioxide is substantially completely reduced to lower oxides. At higher temperatures, the trioxides erupt violently. Also, instead of a fine powder being produced, clinkers are formed, and unreduced oxides may be included in the clinkers with relatively fine metal. That product is not commercially useful.

To slow the reaction in order to avoid these undesirable consequences is most uneconomical of labor, time, reducing gas, and ties up costly equipment. Obviously, the temperature of the reaction may be permitted to rise rapidly due to the exothermic character of the reaction, if a way can be found to reduce rapidly the trioxide to lower oxides before the temperature of the reactants reaches the violent eruption point, and the point where clinkers are formed. Unfortunately, a gaseous reducing agent such as hydrogen is able to penetrate and reduce the molybdenum trioxide efficiently for only a short while. The formation of lower oxides at the top of the mass, accompanied by steam and other reaction products, gradually reduces penetration of the reducing gas while the temperature of the underlying mass of trioxide is rapidly raised by the external heat and by the exothermic character of the reaction. The eruption temperature is soon reached and the violent reaction of hydrogen with the trioxide (spattering) takes place, with accompanying clinker formation.

Since the gaseous reducing agent is not effective in depth, the addition of a solid reducing agent mixed with the trioxide should accomplish a rapid reduction in depth beyond the surface reduction accomplished by the gaseous reducing agent. Rather than slow down the reaction to keep it below the eruption temperature of the trioxide, the reduction may proceed at normal speed. By the time the eruption temperature of the trioxide is reached, substantially all of the higher trioxides will have been reduced to lower oxides. The lower oxides present no problem in reduction to pure metal since they do not erupt and form clinkers, so the process proceeds, until the lower oxides are reduced to metal powder.

Hexamine (hexamethylenetetramine, methenamine) $(CH_2)_6N_4$ has been found to be a suitable solid reducing agent, because it rapidly reduces the trioxide to lower oxides at temperatures below their eruption point. Furthermore, it leaves no residue to impair the purity of the ultimate product.

EXAMPLE I.—HYDROGEN REDUCTION OF MOLYBDENUM TRIOXIDE WITH SOLID REDUCING AGENT

A mixture of molybdenum trioxide and hexamine in a ratio of approximately 5:1 parts by weight is prepared. A ratio of 10:1 has been successfully used with a high rate of hydrogen flow. Batches of approximately 1 to 15 pounds of the mixture are placed in metal boats and are moved to successive stations in a tube furnace. Boats are introduced at the rate of one every 10 to 20 minutes. Previously introduced boats are advanced by their successors or are carried forward by a conveyor system. The initial temperature may be approximately 400° C., maintained by the application of external heat. In the next zone, temperature should be approximately 600° C. Beyond this zone, the temperature should be approximately 1000° C. The next zone is the cooling zone and its temperature falls rapidly since it is surrounded by a jacket through which a coolant is circulated. The temperature of the boats is rapidly reduced as they move through this zone to approximately 20° C.

The reduction period is dependent upon the rate of hydrogen flow, the ratio of oxide to solid reducing agent, and the quantity of the mixture in the boat. With one pound of the mixture in the boat, the boat should remain in the first or 400° C. zone for approximately ten minutes. The same boat should remain in the second or 600° C. zone for approximately ten minutes. The 1000° C. zone has approximately 7 places for boats, so that at the rate of progress used for illustration (one boat introduced every ten minutes), a particular boat will remain in the third or 1000° C. zone for approximately 70 minutes. The cooling zone may accommodate approximately 7 boats, and so a particular boat will move through that fourth cooling zone in 70 minutes. The overall elapsed time is 2 hours and 40 minutes from trioxide to molybdenum powder.

It is to be noted that in the first 400° C. zone, substantially all of the trioxide is in 10 minutes reduced to lower oxides.

The rate at which hydrogen flows may be approximately 25 to 50 cubic feet per hour.

The hexamine as a solid reducing agent reacts with the molybdenum trioxide to form either molybdenum metal, molybdenum dioxide, or any combination thereof (while these equations, and subsequent equations involving hexamine in the other examples, postulate the complete oxidation of the hexamine, actually carbon monoxide and decomposition products of hexamine are also formed):

$$(CH_2)_6N_4 + 6MoO_3 \rightarrow 6Mo + 6CO_2 + 6H_2O + 2N_2$$
$$(CH_2)_6N_4 + 18MoO_3 \rightarrow 18MoO_2 + 6CO_2 + 6H_2O + 2N_2$$

The hexamine as a solid reducing agent also reacts with molybdenum dioxide to form molybdenum metal:

$$(CH_2)_6N_4 + 9MoO_2 \rightarrow 9Mo + 6CO_2 + 6H_2O + 2N_2$$

The hydrogen as a gaseous reducing agent reduces some of the molybdenum trioxide to molybdenum dioxide:

$$MoO_3 + H_2 \rightarrow MoO_2 + H_2O$$

Any molybdenum dioxide not reduced by the hexamine is reduced by the hydrogen:

$$MoO_2 + 2H_2 \rightarrow Mo + 2H_2O$$

The ultimate product of the reduction is a uniform, fine grain, high purity molybdenum powder.

EXAMPLE II.—CARBON MONOXIDE REDUCTION OF MOLYBDENUM TRIOXIDE WITH A SOLID REDUCING AGENT

If carbon monoxide is used as a gaseous reducing agent instead of hydrogen, the solid reducing agent hexamine performs as in Example I. However, as in Example I, some of the lower oxides are formed by the gaseous reducing agent:

$$MoO_3 + CO \rightarrow CO_2 + MoO_2$$

Any of the molybdenum dioxide, $MoO_2$, not reduced by the hexamine, is then reduced to metal powder:

$$MoO_2 + 2CO \rightarrow Mo + 2CO_2$$

EXAMPLE III.—AMMONIA REDUCTION OF MOLYBDENUM TRIOXIDE WITH A SOLID REDUCING AGENT

Ammonia may be used instead of hydrogen as a gaseous reducing agent for molybdenum trioxide, with a solid reducing agent:

$$3MoO_3 + 2NH_3 \rightarrow 3MoO_2 + 3H_2O + N_2$$
$$3MoO_2 + 4NH_3 \rightarrow 3Mo + 6H_2O + 2N_2$$

The hexamine reduction proceeds as in Example I. Mixtures of gaseous reducing agents may also be used as the gaseous reducing agent.

Respecting Examples II and III, the quantitative presence of carbon monoxide or ammonia has been found to be critical because carbides or nitrides may be formed. The formation of carbides or nitrides is avoided by using a mixture of hydrogen with carbon monoxide, or a mixture of hydrogen with ammonia, or a mixture of hydrogen with carbon monoxide and ammonia.

There are numerous other gaseous reducing agents which may be used among which are methane, vaporized gasoline, propane, endogas, producer gas, water gas, metallic vapors such as calcium or sodium, and mixtures of reducing gases.

Reduction of other molybdenum compounds may also be accomplished:

EXAMPLE IV.—REDUCTION OF AMMONIUM MOLYBDATE WITH GASEOUS AND SOLID REDUCING AGENT $$6(NH_4)_2MoO_4 + (CH_2)_6N_4$$
$$\rightarrow 12NH_3 + 6Mo + 6CO_2 + 12H_2O + 2N_2$$
$$(NH_4)_2MoO_4 + 3H_2 \rightarrow 2NH_3 + Mo + 4H_2O$$

Ammonium heptamolybdate, $(NH_4)_6Mo_7O_{24} \cdot 4H_2O$, reduction is similar.

EXAMPLE V.—REDUCTION OF TUNGSTIC OXIDE WITH GASEOUS AND SOLID REDUCING AGENT

The effectiveness of the reduction with both gaseous and solid reducing agents is not confined to molybdenum. Thus tungstic oxide may be effectively reduced to tungsten powder:

$$6WO_3 + (CH_2)_6N_4 \rightarrow 6W + 6CO_2 + 6H_2O + 2N_2$$
$$WO_3 + 3H_2 \rightarrow W + 3H_2O$$

EXAMPLE VI.—REDUCTION OF AMMONIUM PARATUNGSTATE WITH GASEOUS AND SOLID REDUCING AGENTS $$5(NH_4)_2O \cdot 12WO_3 \cdot 5H_2O + 36H_2 \rightarrow 12W + 10NH_3 + 46H_2O$$
$$5(NH_4)_2O \cdot 12WO_3 \cdot 5H_2O + 2(CH_2)_6N_4$$
$$\rightarrow 12W + 4N_2 + 12CO_2 + 10NH_3 + 22H_2O$$

EXAMPLE VII.—FATS AS ALTERNATIVE SOLID REDUCING AGENTS

Fats have been found to be satisfactory as solid reducing agents if they leave no residue. Such a fat may have this composition:

| | Percent |
|---|---|
| C | 76.5 |
| H | 12.8 |
| O | 10.7 |

Such a fat is available commercially as "Sterotex."

EXAMPLE VIII.—WAXES AS ALTERNATIVE SOLID REDUCING AGENTS

Waxes have also been found to be satisfactory as solid reducing agents if they do not leave a residue. Such a wax may have this composition:

| | Percent |
|---|---|
| C | 75 |
| H | 13 |
| O | 5 |
| N | 7 |

This wax is commercially available as "Acrawax."

EXAMPLE IX.—CARBOHYDRATE AS ALTERNATIVE SOLID REDUCING AGENTS

Starch $(C_6H_{10}O_5)_n$ is an example of a carbohydrate solid reducing agent useful instead of hexamine. Unfortunately, under some conditions, a residue of approximately 2% carbon remains as a metal carbide. The ideal reaction may be postulated thus:

$$C_6H_{10}O_5 + 2MoO_3 \rightarrow 2Mo + 6CO + 5H_2O$$

EXAMPLE X.—A HEXAMINE DERIVATIVE AS AN ALTERNATIVE SOLID REDUCING AGENT

Methenamine anhydromethylenecitrate $$C_7H_8O_7 \cdot (CH_2)_6N_4$$

is a hexamine derivative available commercially as "Helmitol." It has this percentage composition:

| | Percent |
|---|---|
| C | 45.34 |
| H | 5.68 |
| Methenamine | 40.71 |
| N | 16.27 |

EXAMPLE XI.—USE OF SOLID REDUCING AGENT WITHOUT GASEOUS REDUCING AGENT

It is apparent from the first reaction in Example I that the solid reducing agent alone will reduce metal compounds such as molybdenum trioxide to fine metal powder without the use of a gaseous reducing agent such as hydrogen. In carrying out such a reduction process, the atmosphere must be inert or non-oxidizing—otherwise the metal powder will revert to oxides. Furthermore, the temperature must be carefully controlled so as to avoid excessive loss of the solid reducing agent by vaporization. For example, in the case of hexamine the temperature has to be kept as close to approximately 400° C. as possible. Above 400° C., the hexamine may be rapidly vaporized so that much of it may escape unreacted without reducing some of the metal. This is especially true if the externally applied heat of the furnace, in conjunction with the heat of the reduction reaction, elevates the temperature greatly beyond 400° C.

With other solid reducing agents, different temperature limitations will of course apply. Under high temperature conditions, it is necessary to replenish the hexamine (or other solid reducing agent) if it becomes exhausted before the reduction is complete. This can be done by providing the furnace with an airlock through which the solid reducing agent may be added and intermixed with the metal compound and metal powder in the boat.

Definition

Critical temperature is the temperature at which reduction is defeated or impaired by the metal compound (which is to be reduced) spattering, erupting, or leaving the intended reduction zone.

Reduction methods using one or more solid reducing agents have been described. The reduction by such solid agents may be combined with the conventional gaseous reducing agent methods. A variety of solid as well as gaseous reducing agents may be used. The metal compounds reduced are various, and the method is applicable to many metals. The temperature at which the reduction proceeds must be controlled in accordance with the nature of the metal compound being reduced. Thus, it is apparent that many changes may be made within the scope of the appended claims without departing from the spirit of the invention.

What is claimed:

1. A process for reducing a metallic compound having a critical temperature of approximately 700° C. maximum, to pure metallic powder comprising
 adding a solid organic reducing agent to the metal compound which agent consists of material selected from the group consisting of hexamine and hexamine derivatives,
 heating the solid organic reducing agent and metal compound in a gaseous reducing agent to effect reaction between both reducing agents with the metal compound to reduce substantially all of the metal compound before the critical temperature is reached,
 and continuing the heating in the gaseous reducing agent until the metallic product is completely reduced to metal.

2. A process for reducing a metallic compound having a critical temperature of approximately 700° C. maximum, to pure metallic powder comprising
 the process of claim 1 in which the gaseous reducing agent is derived from vaporizing at least a portion of the solid organic reducing agent.

3. A process for reducing a metallic compound having a critical temperature of approximately 700° C. maximum, to pure metallic powder comprising
 the process of claim 1 in which a portion of the gaseous reducing agent is derived from vaporizing at least a portion of the solid organic reducing agent.

4. The process of claim 1 in which the first heating is up to approximately 400° C. and the continued heating is above approximately 400° C.

5. The process of claim 1 in which the solid reducing agent is added to the metal compound in a range of approximately 1:5 to 1:10 parts by weight.

6. A process for reducing a metallic compound having a critical temperature of approximately 700° C. maximum, to pure metallic powder comprising
 adding a solid organic reducing agent to a metallic oxide, which agent consists of material selected from the group consisting of hexamine and hexamine derivatives,
 heating the solid organic reducing agent and metallic oxide in a gaseous reducing agent to effect reaction between both reducing agents with the metallic oxide to reduce substantially all of the metallic oxide before the critical temperature is reached,
 and continuing the heating in the gaseous reducing agent until the metallic product is completely reduced to metal.

7. A process for reducing a metallic compound having a critical temperature of approximately 700° C. maximum, to pure metallic powder comprising
 adding a solid organic reducing agent to material selected from the group consisting of oxides of tungsten, oxides of molybdenum, ammonium paratungstate, ammonium molybdate, and mixtures of the respective metal compounds, and which solid organic reducing agent consists of material selected from the group consisting of hexamine and hexamine derivatives,
 heating the solid organic reducing agent and the selected material in a gaseous reducing agent to effect reaction between both reducing agents with the selected material to reduce substantially all of the selected material before the critical temperature is reached,
 and continuing the heating in the gaseous reducing agent until the metallic product is completely reduced to metal.

8. A process for reducing a metallic compound having a critical temperature of approximately 700° C. maximum, to pure metallic powder comprising
 adding a solid organic reducing agent to the metal compound, which agent consists of material selected from the group consisting of hexamine and hexamine derivatives,
 heating the solid organic reducing agent and metal compound in a gaseous reducing agent to effect a reaction between both reducing agents and throughout the metal compound in depth to reduce substantially all of the metal compound before the critical temperature is reached,
 and continuing the heating in the gaseous reducing agent until the metallic product is completely reduced to metal.

9. A process for reducing a metallic compound having a critical temperature of approximately 700° C. maximum, to pure metallic powder comprising
 adding hexamine to tungsten trioxide,
 heating the hexamine and the tungsten trioxide in a hydrogen atmosphere to effect reaction between both the hexamine and the hydrogen with the tungsten trioxide to reduce substantially all of the tungsten trioxide before the critical temperature is reached,
 and continuing the heating in the hydrogen atmosphere until the metal product is completely reduced to metal.

10. A process for reducing a metallic compound having a critical temperature of approximately 700° C. maximum, to pure metallic powder comprising
 adding hexamine to molybdenum trioxide,
 heating the hexamine and the molybdenum trioxide in a hydrogen atmosphere to effect reaction between both the hexamine and the hydrogen with the molybdenum trioxide to reduce substantially all of the molybdenum trioxide before the critical temperature is reached,
 and continuing the heating in the hydrogen atmosphere until the metal product is completely reduced to metal.

11. A process for reducing a metallic compound having a critical temperature of approximately 700° C. maximum, to pure metallic powder comprising adding hexamine to ammonium paratungstate, heating the hexamine and the ammonium paratungstate in a hydrogen atmosphere to effect reaction between both the hexamine and the hydrogen with the ammonium paratungstate to reduce substantially all of the ammonium paratungstate before the critical temperature is reached, and continuing the heating in the hydrogen atmosphere until the metal product is completely reduced to metal.

12. A process for reducing a metallic compound having a critical temperature of approximately 700° C. maximum, to pure metallic powder comprising adding hexamine to ammonium molybdate, heating the hexamine and the ammonium molybdate in a hydrogen atmosphere to effect reaction between both the hexamine and the hydrogen with the ammonium molybdate to reduce substantially all of the ammonium molybdate before the critical temperature is reached, and continuing the heating in the hydrogen atmosphere until the metal product is completely reduced to metal.

References Cited in the file of this patent

UNITED STATES PATENTS

| | | |
|---|---|---|
| 1,867,755 | Pelc | July 19, 1932 |
| 2,398,114 | Rennie | Apr. 9, 1946 |
| 2,776,887 | Kelly | Jan. 8, 1957 |
| 2,855,294 | Tribalat | Oct. 7, 1958 |